United States Patent [19]

Naito et al.

[11] Patent Number: 4,821,876

[45] Date of Patent: Apr. 18, 1989

[54] MAGAZINE FOR LIGHT-SENSITIVE MATERIAL HAVING A CONTOURED FOLDED PORTION ADJACENT A MATERIAL DISPENSING OPENING OF THE MAGAZINE

[75] Inventors: Hideo Naito; Tsukasa Matsuda; Katsuhiko Uchiyama, all of Kanagawa, Japan

[73] Assignee: Fuji Photo Film Co., Ltd., Minami-ashigara, Japan

[21] Appl. No.: 149,562

[22] Filed: Jan. 28, 1988

[30] Foreign Application Priority Data

Jan. 28, 1987 [JP] Japan ................................. 62-18082
Jan. 28, 1987 [JP] Japan ................................. 62-18083

[51] Int. Cl.⁴ .............................................. B65D 85/67
[52] U.S. Cl. ................................. 242/71.1; 206/395; 206/407; 206/409; 206/455; 206/316.1; 354/277
[58] Field of Search ........ 206/316, 389, 404, 407–410, 206/414, 455, 395; 242/68.7, 71.1, 71.7; 354/275, 277; 352/72, 75, 78 R

[56] References Cited

U.S. PATENT DOCUMENTS

| | | | |
|---|---|---|---|
| 1,103,417 | 7/1914 | Hoplim | 354/277 X |
| 1,219,588 | 3/1917 | Rutton et al. | 354/277 X |
| 1,794,926 | 3/1931 | Taylor | 242/71.1 |
| 1,930,335 | 10/1933 | Bornmann | 242/71.1 |
| 2,114,638 | 4/1938 | Parker | 354/277 |
| 3,537,376 | 11/1970 | Fleming et al. | 354/277 |
| 4,034,929 | 7/1977 | Ebner, Jr. | 242/71.1 |
| 4,212,389 | 7/1980 | Robbins | 206/316 |
| 4,239,164 | 12/1980 | Barnsbee et al. | 206/409 X |
| 4,403,845 | 9/1983 | Buelens et al. | 354/275 |
| 4,639,386 | 1/1987 | Akao | . |
| 4,671,409 | 6/1987 | Espy | 206/407 X |
| 4,730,778 | 3/1988 | Akao | . |

*Primary Examiner*—Stephen Marcus
*Assistant Examiner*—Bryon Gehman
*Attorney, Agent, or Firm*—Burns, Doane, Swecker & Mathis

[57] ABSTRACT

A magazine for light-sensitive materials comprises a tubular body and side plates covering each of both sides of the tubular body. The tubular body is formed by bending a sheet material having folded portions at both ends so as to form a slit between both ends and having such a structure that an upper part of the magazine is formed of a portion of the bent material in a region near one end and a front wall part of the magazine is formed of a portion of the bent material in a region near other end. A cured resin is provided within a space formed between the folded portion positioned at the end of the upper part and a portion of the upper part corresponding to the folded portion. Otherwise, a forehead portion having a upper edge and a lower edge is formed of the bent material in an area between the upper part and the folded portion positioned at the end of the upper part. The forehead portion has a plane essentially parallel to the front wall part and a central portion of at least lower edge thereof being outwardly bulged so as to form an arc.

7 Claims, 5 Drawing Sheets

FIG.2-A
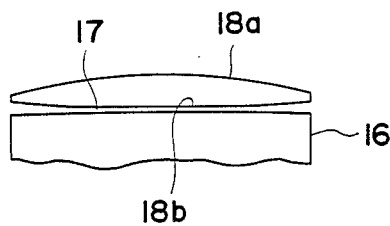
FIG.2-B
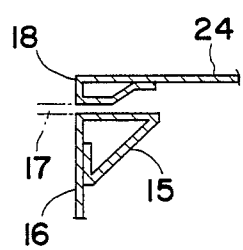
FIG.2-C
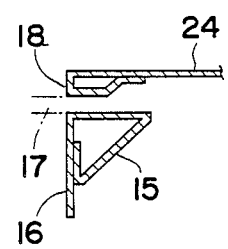

FIG. 3-A
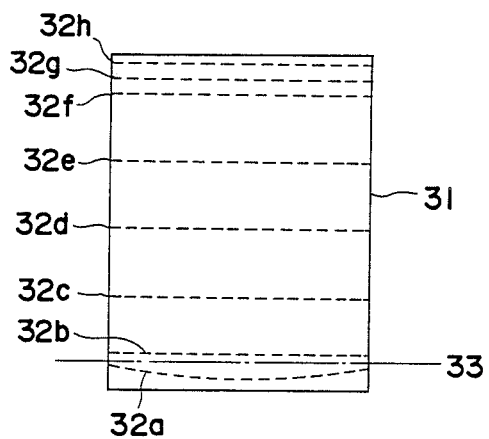
FIG. 3-B
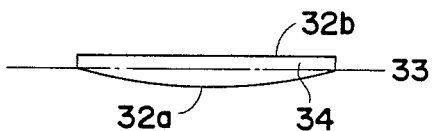
FIG. 3-C
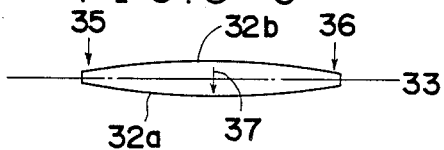

FIG.4-A
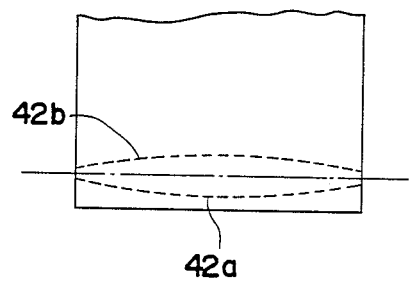
FIG.4-B
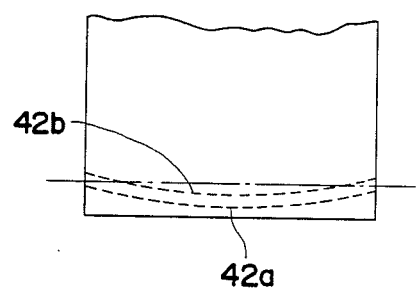
FIG.5
PRIOR ART
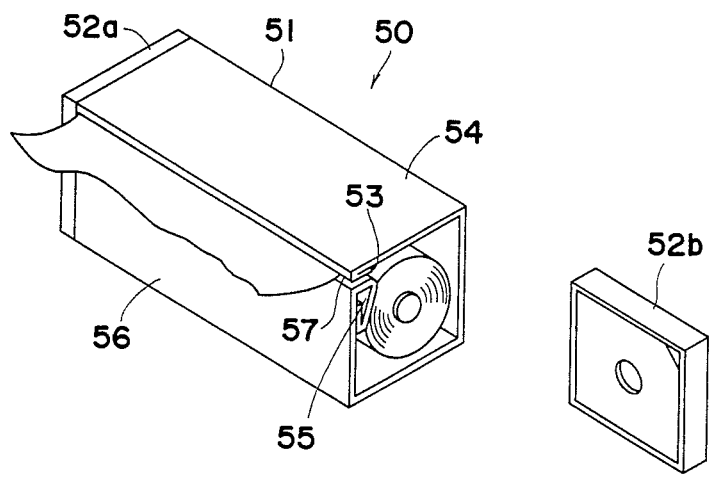

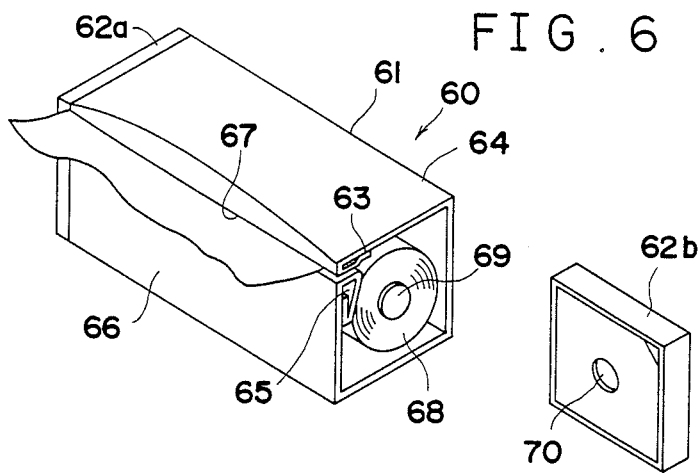
FIG. 6
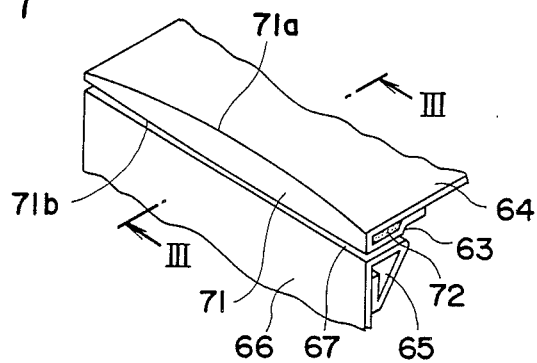
FIG. 7
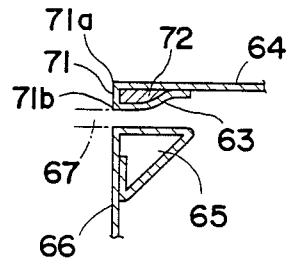
FIG. 7-A

MAGAZINE FOR LIGHT-SENSITIVE MATERIAL HAVING A CONTOURED FOLDED PORTION ADJACENT A MATERIAL DISPENSING OPENING OF THE MAGAZINE

BACKGROUND OF THE INVENTION

1. Field of the Invention

The present invention relates to a magazine for light-sensitive materials, which receives a roll of a light-sensitive material and allows the light-sensitive material as such to be drawn out through a slit-form draw-out port thereof and which can be loaded in a printer or other apparata in a light room.

2. Description of Prior Art

Rolls of light-sensitive materials are used in the field of photocomposing machines or other fields of art. Heretofore, the light-sensitive materials have been packed by a light-shielding packaging paper and marketed. At the time of use thereof, they have been repacked into metal magazines provided with a slit for drawing out the light-sensitive material therethrough. Simple magazines made of a cardboard, a corrugated board or a plastic material (so-called disposable magazine) have been used from the viewpoint of the simplicity of operation at the time of use thereof in recent years. In more detail, the light-sensitive material charged into a simple magazine is marketed and used as such by user without repacking. After the light-sensitive material have been fully used, the simple magazine is discarded. It is desirable that such a disposable magazine is as inexpensive as possible, and has a structure which is simple and can be easily manufactured.

Various disposable magazines have been developed and proposed. FIG. 5 is a perspective view showing the structure of a typical disposable magazine which is conventionally used.

Referring to FIG. 5, a magazine 50 comprises a tubular body 51 formed by bending a sheet material and side plates 52a, 52b fixed to both sides of the tubular body 51. Both ends of the sheet material have such structures that one end constituting an upper part has a folded portion 53 and other end constituting a front wall part 56 has a folded portion 55. A slit 57 is formed between both folded portions. Generally, the inside of the slit is coated with a buffer cloth to shield light and to prevent the light-sensitive sheet from being inadvertently marked.

The folded portion 53 of the above simple magazine is formed in such a manner that a straight line is marked in the width direction on the corresponding portion of the upper part 54 of a sheet material by pressing, and the end of the sheet material is inwardly folded along the pressed line.

The disposable magazine has an advantage in that there is no need of an operation for repacking the light-sensitive material in a dark room. However, when easily deformable materials such as a carton board and a corrugated board are employed as the sheet materials, some problems occur.

Particularly serious problems are that the slit is liable to be enlarged at its central portion due to the rigidity of the material constituting the body in the course of forming the magazine and further that the slit is enlarged by external factors (shock, temperature, humidity, etc.) in the course of transportation or use.

When such deformation takes place continuously or repeatedly over a long period of time, the slit is no longer restored to the original form, because the expanded slit portion is fixed or permanetly deformed under such condition. When such a slit-deformed magazine is used, light is insufficiently shielded so that it is possible that the light-sensitive material placed therein is exposed to light before use. The deformation of the slit takes place frequently, particularly in a magazine for a light-sensitive material having a large width.

SUMMARY OF THE INVENTION

It is an object of the present invention to provide a magazine (or cartridge) for light-sensitive materials, in which a slit portion thereof is resistant to deformation and which highly effective in shielding light.

It is another object of the invention to provide a magazine for light-sensitive materials, which can be manufactured easily and inexpensively.

The present invention provides, as a first embodiment, a magazine for light-sensitive materials, which comprises a tubular body and side plates covering each of the sides of said tubular body; said tubular body being formed by bending a sheet material having folded portions at both ends thereof so as to form a slit between said both ends and having such a structure that an upper part of the magazine is formed of a portion of the bent material in a region near one end and a front wall part of the magazine is formed of a portion of the bent material in a region near other end, wherein a forehead portion having a upper edge and a lower edge is formed of the bent material in an area between said upper part and said folded portion positioned at the end of the upper part, said forehead portion having a plane essentially parallel to said front wall part and a central portion of at least lower edge thereof being outwardly bulged so as to form an arc.

The present invention also provides, as a second embodiment, a magazine for light-sensitive materials, which comprises a tubular body and side plates covering each of the sides of said tubular body; said tubular body being formed by bending a sheet material having folded portions at both ends thereof so as to form a slit between said both ends and having such a structure that an upper part of the magazine is formed of a portion of the bent material in a region near one end and a front wall part of the magazine is formed of a portion of the bent material in a region near other end, wherein a cured resin is provided within a space formed between the folded portion positioned at the end of the upper part and a portion of the upper part corresponding to the folded portion.

BRIEF DESCRIPTION OF THE DRAWINGS

FIG. 2-A is a front view of the folded portion of FIG. 2.

FIG. 2-B is a cross-sectional view taken along the line I—I in FIG. 2.

FIG. 2-C is a cross-sectional view taken along the line II—II in FIG. 2.

FIG. 3-A is a schematic view illustrating an example of a sheet material used for the preparation of the tubular body of a magazine according to the first embodiment of the invention, and FIGS. 3-B and 3-C show typical foreheads of the magazine according to the invention.

FIGS. 4-A and 4-B are schematic views illustrating other structures of magazines according to the invention.

FIG. 5 is a perspective view showing conventional magazine for light-sensitive materials.

FIG. 6 is a perspective view showing an example of the second embodiment of a magazine for light-sensitive materials according to the present invention.

FIG. 7 is a perspective view showing a forehead portion of the second embodiment of a magazine for light-sensitive materials according to the invention.

FIG. 7-A is a cross-sectional view taken along the line III—III in FIG. 7.

DETAILED DESCRIPTION OF THE INVENTION

The magazine for light-sensitive materials according to the first embodiment of the present invention will be described in more detail hereinbelow by referring to FIGS. 1 to 4-B.

Figure 1:
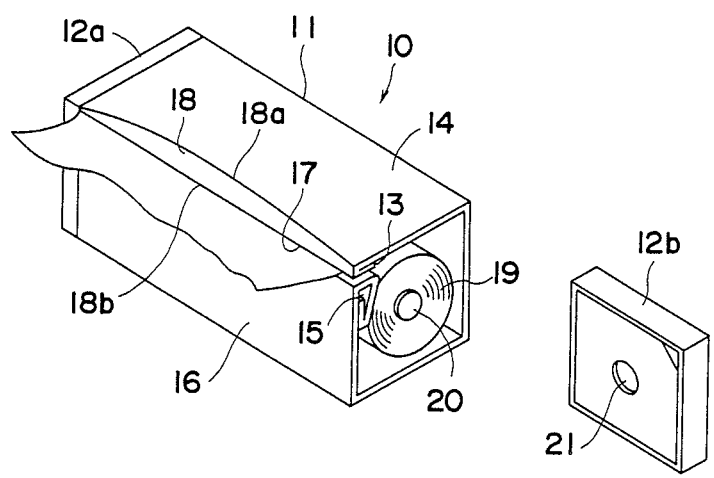
FIG. 1 is a perspective view showing an example of the first embodiment of a magazine for light-sensitive materials according to the present invention.

FIG. 1 is a perspective view showing a preferred structure of a magazine according to the first embodiment of the invention. In FIG. 1, one side plate is detached for the purpose of facilitating the understanding of the internal structure of the magazine.

In FIG. 1, a magazine 10 comprises a tubular body 11 formed by bending a sheet material having folded portions at both ends thereof and side plates 12a, 12b which cover both sides of said tubular body 11, respectively. One folded portion 13 is formed by inwardly folding the end of a region which forms the upper part 14 of said tubular body 11. The remaining folded portion 15 is formed by inwardly folding the end of a region which forms the front wall part 16 of said tubular body 11. A slit 17 is formed between both ends.

The folded portion 13 positioned at the end of the upper part 14 has a forehead 18 having a plane nearly parallel to the front wall part 16 on the front side thereof. The forehead 18 has an upper edge 18a and a lower edge 18b and any of the upper edge and the lower edge is in the form of an arc in such a structure that the central portion of the edge is outwardly bulged.

The side plates 12a, 12b are fixed to both sides of the tubular body 11. At the central portion of the side plate, there is provided a hub hole 21 for receiving a paper core 20 for a roll of a sheet-form light-sensitive material 19. In the above structure, the light-sensitive material can be easily rotated within the tubular body and can be properly drawn out through the slit.

Figure 2:
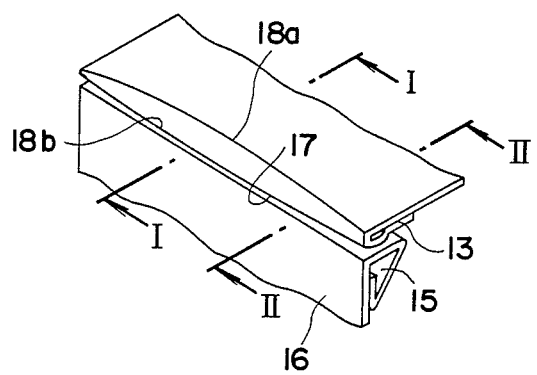
FIG. 2 is a perspective view showing a forehead portion of the first embodiment of a magazine according to the present invention.

FIG. 2 and FIGS. 2-A to 2-C diagrammatically show the structure of the folded portion at the end of the upper part, which is a characteristic feature of the first embodiment of the present invention.

FIG. 2 is a partial view illustrating particularly a forehead portion of the magazine wherein on the front side of the folded portion 13 positioned at the end of the upper part 14, there is formed the forehead 18 whose plane is approximately parallel to the front wall part 16.

FIG. 2-A is a front view of the folded portion of FIG. 2. FIG. 2-B is a cross-sectional view taken along the line I—I in FIG. 2, and FIG. 2-C is a cross-sectional view taken along the line II—II in FIG. 2.

The plane of the forehead 18 is approximately parallel to the front wall part 16 and the forehead 18 has an upper edge 18a and the lower edge 18b. The central portion of the upper edge and the lower edge is outwardly bulged so as to form an arc. It is preferred that the forehead is formed so as to be parallel to the front wall part. However, no technical problems are prevented even when either or both of the upper edge and the lower edge are somewhat protruded from the plane of the front wall part. Through the central portion of each of the upper edge 18a and the lower edge 18b is outwardly bulged so as to form an arc, it is not necessary that the form is a true arc. For example, it may be such a form that there is an apex at the center of the upper edge and a gentle curve extends from said apex toward each of both sides of the upper edge. That is, the form may be nearly a triangle. Alternatively, it may take a form such that the central portion of the upper edge is in the form of a straight line and a gentle curve is drawn from each end of the straight line toward each side of the forehead. That is, the form may be like a trapezoid.

In the embodiment of the accompanying drawing, the folded portion 15 provided at the end of the front wall part 16 which is formed so as to give a cross-section in the form of a triangle. However, the form is by no means limited thereto and other forms may be used. For example, the folded plane constituting the slit may be approximately horizontal. Alternatively, the folded plane may be sloped at the given angle toward the inside of the tubular body.

The assembly operation of the tubular body of the magazine according to the invention will be described in more detail hereinbelow by referring to FIG. 3.

FIGS. 3(A) to 3(C) diagrammatically show a process comprising steps of bending a sheet of a material such as corrugated board to form the tubular body of a magazine including the forehead positioned at the end of the upper part thereof and further fixing the forehead at both sides thereof (the finished form of the magazine).

FIG. 3-A is a developed view of the tubular body of the magazine, wherein a pressed line is formed on the sheet. FIG. 3-B diagrammatically shows the shape of the forehead formed by bending the end of the upper part along said pressed line. FIG. 3-C diagrammatically shows the form of said forehead wherein said forehead is fixed at both ends thereof, whereby the finished magazine can be formed.

Referring to FIG. 3-A, pressed lines 32a to 32h are drawn so as to allow the tubular body 31 of a magazine to be formed according to conventional technique in which a sheet such as corrugated board is pressed to form a line. The pressed lines for forming the forehead positioned at the end of the upper part must be drawn so that the central portion of one pressed line 32a (which forms the lower edge) must be bulged outwardly against the horizontal so as to form an arc and the other pressed line 32b (which forms the upper edge) is a straight line as shown in FIG. 3-A. As described above, it is not necessary that the arc-shaped pressed line 32a is in the form of a true arc. However, it is desirable that the arc-shaped line is formed at a given curvature radius from the viewpoint of simplicity of processing operation (i.e., assembly operation). The curvature radius of the arc varies depending on the width of the sheet (the width of the tubular body), but it is about 7 to 9 m, when a magazine of 30 cm in width is prepared.

In FIG. 3-A, one line of two pressed lines for forming the forehead is drawn so that the central portion thereof is bulged outwardly against the horizontal so as to draw an arc. However, a shape of the pressed line may be in other form. For example, pressed lines 42a, 42b may be drawn so that the central portions of both lines are outwardly bulged in the opposite direction from each other and each line is in the form of an arc, as shown in FIG. 4-A. Alternatively, the two lines may be drawn so that the central portions thereof are outwardly bulged in the same direction against the horizontal, as shown in FIG. 4-B. If desired, the pressed lines may be symmetrically drawn, or may be formed at different curvature radiuses of the arc. Each of the curvature radiuses can be optionally determined.

The sheet material is bent along the pressed lines formed in the above-described manner and assembled so as to bring both ends into contact with each other, whereby the forehead 34 having the arc-shaped lower edge 32a and the approximately straight-line upper edge 32b can be obtained as shown in FIG. 3-B.

The thus-obtained forehead 34 is fixed by fixing both sides thereof, so as to form the finished forehead for a magazine.

When both sides are fixed as indicated by arrows 35, 36 [fixed by both side plates (not shown)] as shown in FIG. 3-C, force 37 (indicated by the arrow) in the direction of the lower side (slit) is applied to the lower portion of the central portion of the forehead. Hence, the upper part is prevented from being outwardly bent. The amount of force 37 varies depending on the rigidity, etc. of materials to be used.

Force 37, applied to the lower portion of the central portion of the forehead, is exerted by forming the pressed lines in the form of an arc, bending the sheet along the lines [the state shown in FIG. 3-B] and fixed both sides [the state shown in FIG. 3-C]. If desired, the force 37 can be increased utilizing a method wherein after bending, the pressed line is shaped under force into an arc by means of a press tool. In more detail, in the step of FIG. 3-B, there is used a press tool having a length approximately equal to the width of the sheet and such a structure that when the sheet is put between upper and lower members, an arc is formed. The upper part near the forehead and its folded portion are put between the upper and the lower members and the pressed line is shaped into an arc (according to press molding). This method is particularly effective when carried out in a step where a resin material is charged into a space between the upper part and its folded portion and cured, as described hereinafter. According to this method, the force indicated by arrow 37 can be further reinforced or exerted.

According to the above structure, troubles such as a lowering in the light shielding capabilities of the magazine are rarely encountered, even when a powerful force capable of lifting the forehead is applied to cause bending, because when said force is released, the shape of the forehead can be easily restored to the original one and hence there is almost no possibility that the bulge of the slit (the bulge of the central portion) is permanently created.

As described above, it is preferred that a resin layer composed of a resin material is formed in a space between the upper part 14 and its folded portion 13, so as to increase the strength of the forehead 18. There is no specific limitation with respect to the resin material which is a curable adhesive without adversely influencing the light-sensitive material by exposure. Preferred examples of the resin material include curable adhesives such as thermosetting adhesives (e.g., amino resin, polyester resin, polyurethane resin, etc.), theremoplastic adhesives (e.g., polyvinyl acetate resin, vinyl acetate-vinyl chloride copolymer, acrylic resin, polyamide resin, etc.), and hot-melt adhesives (adhesives composed of a major proportion of a thermoplastic adhesive and a minor proportion of other adhesive such as ethylene-vinyl acetate copolymer (EVA), polyethylene, atactic polypropylene (APP), ethylene-ethyl acrylate copolymer (EEA), polyamide, polyester, etc.). Particularly preferred are hot-melt adhesives.

Plastic materials such as a polymer sheet in addition to paper materials such as corrugated board and cardboard can be used as materials for the magazine of the present invention.

In the magazine for light-sensitive material according to the first embodiment of the present invention, the folded portion positioned at the end of the upper part, which partitions the upper part of the slit, has the forehead having a plane substantially parallel to the front wall part and the forehead has a specific shape. Thus, restoring force exerted by the structure can be utilized, so that the end of the upper part is hardly bent in the upper direction (in the opposite direction from the slit) in the vicinity of its central portion and the slit is effectively prevented from being deformed. In more detail, the forehead of the folded portion positioned at the end of the upper part and formed by bending a sheet, is in the form of an arc. Thus, when both sides of the folded portion are fixed by the side plates, force in the direction of lower part is applied to a region in and around the central portion of the lower edge of the forehead, whereby the end of the upper part is prevented from being outwardly bent and the slit is also prevented from being deformed by bending. The forehead is considerably wider in the vertical direction as compared with conventional folded portion. Thus, the strength of the folded portion against bending is increased and hence the deformation is prevented. Accordingly, the magazine of the present invention substantially prevents the deformation of the slit by bending during the course of the assembly, the transportation and the use of the magazine, though conventional magazine easily causes such deformation. Consequently, the magazine of the present invention can be substantially shielded from light.

In addition to the above-described advantages, the magazine of the present invention has further advantages in that the structure itself is simple, it can be easily assembled merely be bending a sheet material and it is disposable.

When the magazine of the present invention is construed by the above-described structure, the light-sensitive material is drawn out through the slit, while it is held between the upper and lower sides, so that there are advantages that troubles or drawbacks such as the twisting of the light-sensitive material, the returning thereof, etc. are substantially prevented.

Most of the above-described advantageous effects can be attained by the second embodiment of the invention. As is described previously, the second embodiment is characterized in that a cured resin is provided within a space formed between the folded portion positioned at the end of the upper part and a portion of the upper part corresponding to the folded portion. In this embodiment, there is no specific need of forming the aforementioned forehead at the folded portion of the upper part of the magazine.

The magazine for light-sensitive materials according to the second embodiment of the present invention will be described hereinbelow by referring to FIGS. 6, 7 and 7-A.

FIG. 6 is a perspective view showing a preferred structure of a magazine according to the second embodiment of the invention. In FIG. 6, one side plate is detached in the same manner as in FIG. 1.

In FIG. 6, a magazine 60 comprises a tubular body 61 formed by bending a sheet material having folded portions at both ends thereof and side plates 62a, 62b which cover both sides of said tubular body 61, respectively. One folded portion 63 is formed by inwardly folding the end of a region which forms the upper part 64 of said tubular body 61. The additional folded portion 65 is formed by inwardly folding the end of a region which forms the front wall part 66 of said tubular body 61. A slit 67 is formed between both ends.

The side plates 62a, 62b are fixed to both sides of the tubular body 61. At the central portion of the side plate, there is provided a hub hole 70 for locking a paper core 69 for a roll of sheet-form light-sensitive material 68.

FIG. 7 and FIG. 7-A diagrammatically show the structure of the folded portion containing a cured resin therein at the end of the upper part, which is a characteristic feature of the second embodiment of the present invention.

FIG. 7 is a partial view illustrating particularly a forehead portion of the magazine of FIG. 6 wherein on the front side of the folded portion 63 positioned at the end of the upper part 64.

FIG. 7-A is a cross-sectional view taken along the line III—III in FIG. 7.

The plane of the forehead 71 is approximately parallel to the front wall part 66 and the forehead 71 comprises the upper edge 71a and the lower edge 71b.

In the embodiment of the accompanying drawings, the folded portion 65 provided at the end of the front wall part 66 and is formed so as to prevent a cross-section in the form of a triangle. However, the form is by no means limited thereto and other form may be used. For example, the folded plane constituting the slit may be approximately horizontal. Alternatively, the folded plane may be sloped at a given angle toward the inside of the tubular body.

Within the space formed by the upper part 64 and the folded portion 63 in combination, a cured resin layer 72 is formed. The cured resin layer can be formed, for instance, by the steps of coating a hot-melt adhesive on inner surfaces of the folded part and the corresponding portion of the upper part, combining both portions to form a folded structure, and heating the folded portion having the coated adhesive under pressure for curing the adhesive. The formation of the cured resin layer is generally performed prior to assembling the magazine. Examples of the resins are those described hereinbefore.

The cured resin layer within the folded area imparts to the folded area of the upper part of the magazine an increased resistance to deformation. Accordingly, the magazine according to the second embodiment of the invention is also advantageously used.

What is claimed is:

1. A magazine for dispensing light-sensitive materials comprising a tubular body having two side portions and side plates covering each of said two side portions of said tubular body; said tubular body being formed by bending a sheet material having folded portions at both ends thereof so as to form a slit between said both ends and having an upper part of the magazine formed by a portion of the bent material in a region adjacent one of said both ends, a front wall part of the magazine formed of a portion of the bent material in a region adjacent the other of said both ends, wherein a forehead portion having a upper edge and a lower edge is formed by the bent material in an area between said upper part and one of said folded portions positioned at said one of said both ends of the upper part, said forehead portion having a plane essentially parallel to said front wall part and a central portion of one of said upper edge and said lower edge thereof being bulged outwardly in a direction parallel to said plane so as to form an arc extending lengthwise of the slit.

2. The magazine for light-sensitive materials as claimed in claim 1, wherein central portions of said upper edge and said lower edge are outwardly bulged so as to form an arc.

3. The magazine for light-sensitive materials as claimed in claim 1, wherein a cured resin is provided within a space formed between said upper part and said one of said folded portions positioned at said one of said both ends of the upper part.

4. The magazine for light-sensitive materials as claimed in claim 3, wherein the cured resin is a hot melt adhesive.

5. A magazine for dispensing light-sensitive materials comprising a tubular body having two side portions and side plates covering each of said two side portions of said tubular body; said tubular body being formed by bending a sheet material having folded portions at both ends thereof so as to form a slit between said both ends and having an upper part of the magazine formed by a portion of the bent material in a region adjacent one of said both ends, a front wall part of the magazine formed of a portion of the bent material in a region adjacent the other of said both ends, wherein a space is provided between one of the folded portions at one of said both ends and another of the folded portions at said one of said both ends, a cured resin material substantially filling said space.

6. The magazine for light-sensitive materials as claimed in claim 5, wherein a forehead portion is formed of the bent material in an area between said upper part and said one of said folded portions positioned at said one of said both ends of the upper part, said forehead portion having a plane essentially parallel to said front wall part.

7. The magazine for light-sensitive materials as claimed in claim 5, wherein the cured resin is a hot melt adhesive.

* * * * *